(12) United States Patent
Embrechts et al.

(10) Patent No.: US 11,317,293 B2
(45) Date of Patent: Apr. 26, 2022

(54) METHODS FOR AUTHENTICATING A USER OF AN ELECTRONIC DEVICE

(71) Applicant: Sony Corporation, Tokyo (JP)

(72) Inventors: Hugo Embrechts, Stuttgart (DE); Gonzalo Bailador Del Pozo, Stuttgart (DE); Dimitri Torfs, Stuttgart (DE); Gaetan De Brucker, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/828,970

(22) Filed: Mar. 25, 2020

(65) Prior Publication Data

US 2020/0314640 A1    Oct. 1, 2020

(30) Foreign Application Priority Data

Mar. 26, 2019  (EP) ..................... 19165273

(51) Int. Cl.
| | |
|---|---|
| *G06F 3/01* | (2006.01) |
| *G06N 20/00* | (2019.01) |
| *G06F 21/36* | (2013.01) |
| *G06F 3/0481* | (2013.01) |
| *H04W 12/68* | (2021.01) |

(Continued)

(52) U.S. Cl.
CPC ............ *H04W 12/68* (2021.01); *G06F 3/017* (2013.01); *G06F 3/04815* (2013.01); *G06F 21/36* (2013.01); *G06N 20/00* (2019.01); *H04M 1/72454* (2021.01)

(58) Field of Classification Search
CPC ........ H04W 12/00508; H04M 1/72569; G06N 20/00; G06F 3/17; G06F 3/04815; G06F 21/36

See application file for complete search history.

(56) References Cited

U.S. PATENT DOCUMENTS

| | | |
|---|---|---|
| 9,229,235 B2 | 1/2016 | Ballard et al. |
| 2013/0251212 A1* | 9/2013 | Leddy ..................... G06F 21/36 382/115 |

(Continued)

FOREIGN PATENT DOCUMENTS

JP    2013020304 A    1/2013

OTHER PUBLICATIONS

Super Mario Bros Manual (Year: 1985).*

(Continued)

*Primary Examiner* — Joshua L Schwartz
(74) *Attorney, Agent, or Firm* — Xsensus, LLP

(57) ABSTRACT

A method for authenticating a user of an electronic device is provided. The method includes displaying a section of a graphical representation to the user on a display of the electronic device. The graphical representation comprises a graphical object. Further, the method includes requesting the user to navigate to the graphical object. Additionally, the method includes capturing data from one or more sensors of the electronic device that is indicative of a movement of the electronic device by the user for navigating to the graphical object and/or data from one or more input devices of the electronic device that is indicative of a user input by the user for navigating to the graphical object. The method further includes authenticating the user based on the captured data.

17 Claims, 4 Drawing Sheets

(51) Int. Cl.
*H04M 1/72454* (2021.01)
*G06F 3/04815* (2022.01)

(56) References Cited

U.S. PATENT DOCUMENTS

| | | | |
|---|---|---|---|
| 2015/0084864 A1* | 3/2015 | Geiss | G06F 21/316 |
| | | | 345/158 |
| 2015/0128255 A1* | 5/2015 | Kuscher | G06F 3/03547 |
| | | | 726/19 |
| 2016/0050308 A1 | 2/2016 | Liu et al. | |
| 2016/0286401 A1 | 9/2016 | Rahman et al. | |
| 2020/0100104 A1* | 3/2020 | Paeschke | G06F 21/316 |
| 2020/0134156 A1* | 4/2020 | Sundararajan | G06K 9/00885 |

OTHER PUBLICATIONS

Li, S., et al., "Whose Move is it Anyway? Authenticating Smart Wearable Devices Using Unique Head Movement Patterns," IEEE International Conference on Pervasive Computing and Communications (PerCom), Sydney, Australia, Mar. 14-19, 2016, pp. 1-9.

* cited by examiner

METHODS FOR AUTHENTICATING A USER OF AN ELECTRONIC DEVICE

CROSS-REFERENCE TO RELATED APPLICATION

The present application claims priority to EP 19165273.4, filed Mar. 26, 2019, the entire contents of which are incorporated herein by reference.

FIELD

The present disclosure relates to user authentication. In particular, examples relate to a method for authenticating a user of an electronic device, an electronic device and a server.

BACKGROUND

User authentication is required for many applications. For example, user authentication is required if a user wants to log-in to a service such as a webmail service or a data storage. Conventionally, a user needs to enter a password for authentication, which is time consuming and hard for some users (e.g. children). For some applications, a biometric signature such as a user's fingerprint or a user's face may be used instead of a password. The biometric signature is unique per individual and can, hence, not be specific for each service. Further, dedicated hardware (e.g. a scanner or a three-dimensional camera) is required to detect the biometric signature.

Hence, there may be a desire for improved user authentication.

SUMMARY

This desire is met by apparatuses and methods in accordance with the independent claims. Advantageous embodiments are addressed by the dependent claims.

According to a first aspect, the present disclosure provides a method for authenticating a user of an electronic device. The method comprises displaying a section of a graphical representation to the user on a display of the electronic device. The graphical representation comprises a graphical object. Further, the method comprises requesting the user to navigate to the graphical object. Additionally, the method comprises capturing data from one or more sensors of the electronic device that is indicative of a movement of the electronic device by the user for navigating to the graphical object and/or data from one or more input devices of the electronic device that is indicative of a user input by the user for navigating to the graphical object. The method further comprises authenticating the user based on the captured data.

According to a second aspect, the present disclosure provides another method for authenticating a user of an electronic device. The method comprises receiving, at a server, data from one or more sensors of the electronic device that is indicative of a movement of the electronic device by the user for navigating to a graphical object within a graphical representation displayed to the user by the electronic device and/or data from one or more input devices of the electronic device that is indicative of a user input by the user for navigating to the graphical object. Further, the method comprises comparing, at the server, the data captured from the one or more sensors of the electronic device and/or the one or more input devices of the electronic device with reference data for the user in order to obtain an authentication result. The method additionally comprises transmitting data related to the authentication result from the server to the electronic device.

According to a third aspect, the present disclosure provides an electronic device for authenticating a user of the electronic device. The electronic device comprises a display configured to display a section of a graphical representation to the user. The graphical representation comprises a graphical object. Further, the electronic device comprises a human machine interface configured to output a request to the user to navigate to the graphical object. The electronic device additionally comprises first circuitry configured to capture data from one or more sensors of the electronic device that is indicative of a movement of the electronic device by the user for navigating to the graphical object and/or data from one or more input devices of the electronic device that is indicative of a user input by the user for navigating to the graphical object. Further, the electronic device comprises second circuitry configured to authenticate the user based on the captured data.

According to a fourth aspect, the present disclosure provides a server for authenticating a user of an electronic device. The server comprises a receiver configured to receive data from one or more sensors of the electronic device that is indicative of a movement of the electronic device by the user for navigating to a graphical object within a graphical representation displayed to the user by the electronic device and/or data from one or more input devices of the electronic device that is indicative of a user input by the user for navigating to the graphical object. Further, the server comprises a processor configured to compare the data captured from the one or more sensors of the electronic device and/or the one or more input devices of the electronic device with reference data for the user in order to obtain an authentication result. The server additionally comprises a transmitter configured to transmit data related to the authentication result to the electronic device.

According to a fifth aspect, the present disclosure provides a non-transitory machine readable medium having stored thereon a program having a program code for performing one of proposed methods, when the program is executed on a processor or a programmable hardware.

According to a sixth aspect, the present disclosure provides a program having a program code for performing one of proposed methods, when the program is executed on a processor or a programmable hardware.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
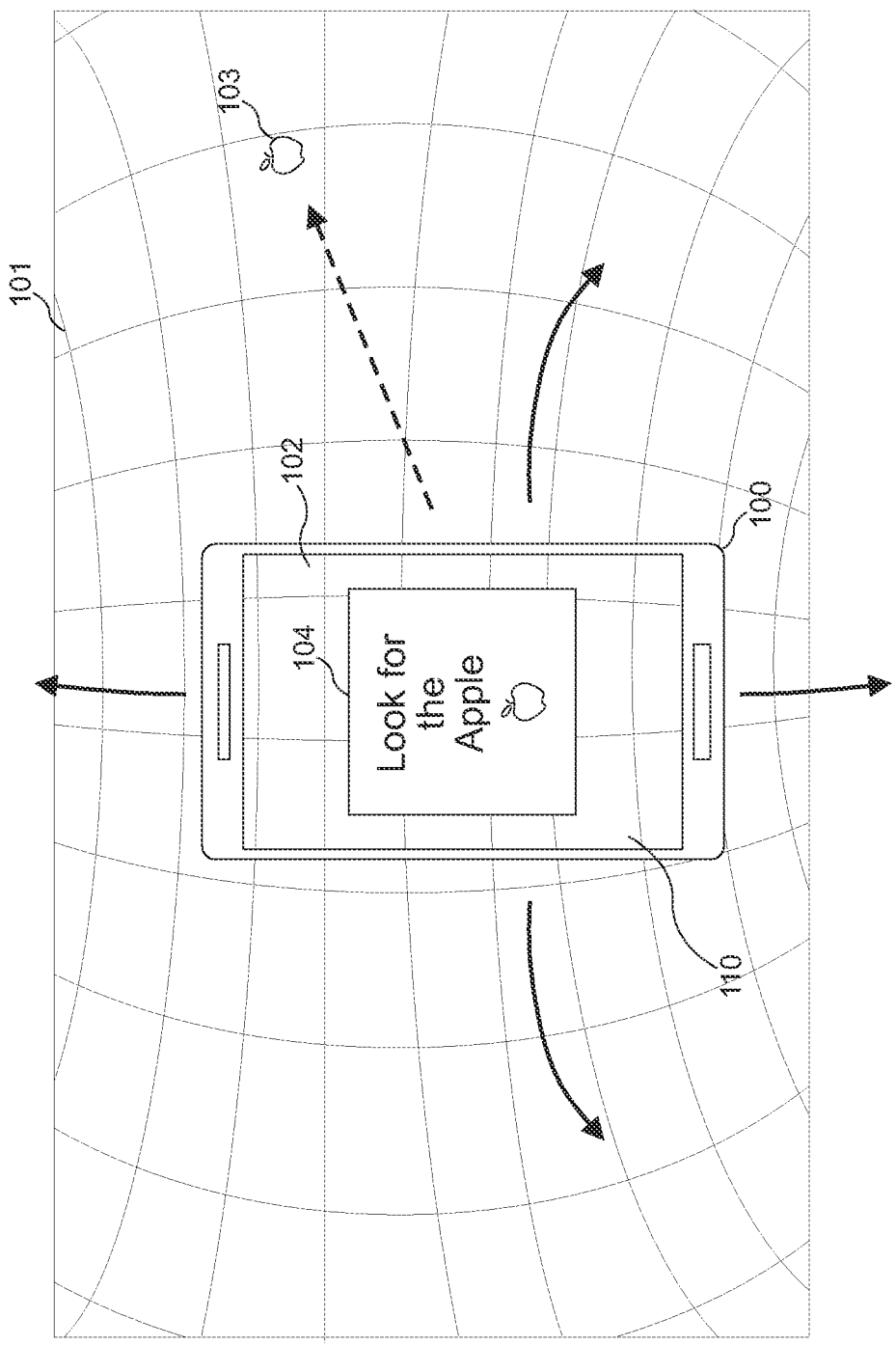
FIG. 1 illustrates an example of an electronic device.

FIG. 1 illustrates an electronic device 100. In the example of FIG. 1, the electronic device 100 is depicted as a mobile phone (smart phone). However, it is to be noted that the example of FIG. 1 is not limiting the present disclosure. In general, the electronic device 100 may be any electronic device capable of providing the below described functionalities. For example, the electronic device 100 may be a tablet-computer, a smart watch, a laptop-computer or a desktop-computer in some examples.

The electronic device comprises a display 110. For authenticating a user of the electronic device, the display 110 is configured to display a changeable section 102 of a graphical representation 101 to the user. For example, the graphical representation 101 may be a three-dimensional (3D) environment as indicated in FIG. 1. In other examples, the graphical representation 101 may, e.g., be a two-dimensional (2D) image, a 360° view, etc. The section 102 of the graphical representation 101 that is displayed to the user via the display 110 is changeable/moveable as indicated by the arrows in FIG. 1. In other words, the user is shown a view that can be navigated.

The graphical representation 101 comprises a graphical object 103 that is located outside the initially displayed section 102 of the graphical representation 101. In the example of FIG. 1, the graphical object 103 is depicted as a red apple. However, it is to be noted that the example of FIG. 1 is not limiting the present disclosure. In general, the graphical object 103 may exhibit any shape or color(s).

Further, the display 110 is configured to display a request 104 to the user to change the displayed section 102 of the graphical representation 101 so that the graphical object 103 is located inside the displayed section 102. That is, the display 110 is configured to display a request 104 to the user to navigate to the graphical object 103. In other words, a point-to-object challenge is shown to the user for authentication. In the example of FIG. 1, the display 110 overlays the request 104 onto the graphical representation 101. However, it is to be noted that the example of FIG. 1 is not limiting the present disclosure. The request 104 may be output to the user by other means than the display 110. For example, the request may be output to the user acoustically via an audio output device of the electronic device 100 such as a loudspeaker, a headset or a headset output. In other examples, the request may be output to the user haptically via a haptical output device of the electronic device 100 such as a vibrator (e.g. using a predefined vibration pattern). That is, the electronic device 100 may, in general, comprises a human machine interface configured to output the request 104 to the user.

Depending on the type of the electronic device 100, the electronic device 100 may offer one or more options for the user to change the displayed section 102 of the graphical representation 101, i.e. for navigating to the graphical object 103. For example, if the electronic device 100 is capable of detecting movement of the electronic device 100 by the user, the user may move the electronic device 100 for changing the displayed section 102 of the graphical representation 101. For detecting the movement of the electronic device 100 by the user, the electronic device 100 may comprise one or more sensors such as an accelerometer, a gyroscope, a magnetometer, or a barometer. If the electronic device 100 comprises one or more input devices for receiving user inputs of the user, the user may give a user input for changing the displayed section 102 of the graphical representation 101. An input device may, e.g., be a touchscreen, a virtual keyboard, a computer or laptop keyboard, a button (key), a computer mouse, a touchpad, or a microphone for receiving voice commands. Accordingly, a user input may, e.g., be a touch and/or a drag on a touchscreen or a touchpad, a pressing of a key on a virtual keyboard or a computer keyboard, a movement and/or a click of a computer mouse or a voice command.

In other words, depending on the type of the electronic device 100, the electronic device 100 may offer one or more options for navigating the displayed section 102 of the graphical representation 101 to the graphical object 103. For example, if the electronic device 100 is a mobile phone as depicted in FIG. 1, the user may move (e.g. translate or rotate) the mobile phone for changing the displayed section 102 of the graphical representation 101. Alternatively or additionally, the user may touch and/or drag a touchscreen of the mobile phone.

The electronic device 100 captures the data from the one or more sensors and/or input devices of the electronic device 100. For example, a (application) processor of the electronic device 100 may capture the data from the one or more sensors and/or input devices of the electronic device 100 and store the data in a memory of the electronic device 100. That is, the electronic device 100 comprises first circuitry (not illustrated) configured to capture data from one or more sensors of the electronic device 100 that is indicative of a movement of the electronic device 100 by the user for changing the displayed section 102 of the graphical representation 101 to include the graphical object 103 (i.e. for navigating to the graphical object 103) and/or data from one or more input devices of the electronic device 100 that is indicative of a user input by the user for changing the displayed section 102 of the graphical representation 101 to include the graphical object 103 (i.e. for navigating to the graphical object 103).

By changing the displayed section 102 of the graphical representation 101, the user may reach the graphical object 103. In other words, the user may navigate the displayed section 102 of the graphical representation 101 to the graphical object 103. Each user uses a specific pattern for navigating to the graphical object 103, i.e. for solving the point-to-object challenge. The pattern for navigating to the graphical object 103 is, hence, individual for each user and may be understood as a movement signature of the user. Since the movement pattern is user specific, it may be used for authenticating the user.

Accordingly, the electronic device 100 comprises second circuitry configured to authenticate the user based on the data captured from the one or more sensors of the electronic device 100 and/or the one or more input devices of the electronic device 100.

Authenticating the user based on the captured data is a behavioural biometric technique that does not require dedicated hardware at the electronic device 100. As described above, a screen together with one or more already present (available) sensors and/or one or more already present (available) input devices of the electronic device 100 may be used. The user specific pattern for navigating to the graphical object 103 is difficult to mimic so that the proposed authentication may enable a high level of confidence. Further, different movements may be used for different services. For example, the graphical object may be located at different positions within the graphical representation for different services and/or different graphical representations may be used for different services.

The location of the graphical object 103 within the graphical representation 101 may, e.g., be determined by the user within an enrolment (training) session. In other words, the user may hide the graphical object 103 in the graphical representation 101. Alternatively, the location of the graphical object 103 within the graphical representation 101 may be independent from the user. For example, the location of the graphical object 103 within the graphical representation 101 may be random. That is, the location of the graphical object 103 within the graphical representation 101 may be different for each authentication session. In some examples, the location of the graphical object 103 within the graphical representation 101 may be the same for each authentication session.

The authentication of the user based on the captured data may be carried out exclusively at the electronic device 100 or may involve an external device such as a server. For example, if the user requests access to data stored on the electronic device 100 or a service running on the electronic device 100, the authentication of the user may be carried out exclusively at the electronic device 100. If the user requests access to data stored on the server or a service running on the server, the authentication of the user may involve the server. In other words, displaying the changeable section 102 of the graphical representation 101 to the user on the display 110 of the electronic device 100 may be carried out if the user requests access to data stored or a service running on the electronic device 100 or the server. Both options will be described in the following in connection with FIGS. 1 and 2.

First, the authentication of the user exclusively at the electronic device 100 will be described in connection with FIG. 1. For example, authenticating the user based on the captured data may comprises comparing, at the electronic device, the data captured from the one or more sensors of the electronic device 100 and/or the one or more input devices of the electronic device 100 with reference data for the user.

For example, the reference data for the user may be a (trained) machine-learning model of the user. The machine-learning model may, e.g., be a Hidden Markov Model (HMM). Previously, the machine-learning model may be determined (trained) based on training data of the user that is collected at the electronic device 100.

Alternatively, the reference data for the user may be training data of the user that is collected at the electronic device 100. The training data may be data from several repetitions of the point-to-object challenge that is stored at the electronic device 100. In other words, lazy learning may be used for generating the reference data.

The new sample of data captured from the one or more sensors of the electronic device 100 and/or the one or more input devices of the electronic device 100 may, hence, either be compared with a previously defined machine-learning model or previously captured instances of the point-to-object challenge (e.g. via dynamic time warping).

If the data captured from the one or more sensors of the electronic device 100 and/or the one or more input devices of the electronic device 100 matches the reference data, the user is authenticated at the electronic device. In other words, the user is first asked to find an object placed at a specific location of the graphical representation 101. After the user finds the object and, e.g., clicks on it, the user is authenticated.

The second circuitry of the electronic device 100 for authenticating the user in accordance with the above explanations may, e.g., be a (application) processor of the electronic device 100.

For training the machine-learning model or providing the training data as reference data, the training data for the user may be collected at the electronic device 100. For example, collecting the training data may comprise repeatedly displaying the changeable section 102 of the graphical representation 101 to the user. In other words, the user may be asked to repeat the point-to-object challenge several times during, e.g., an enrolment session. Therefore, the training data comprises data from the one or more sensors of the electronic device 100 that is indicative of respective movements of the electronic device 100 by the user for repeatedly changing the displayed section 102 of the graphical representation 101 to include the graphical object 103 (i.e. for repeatedly navigating to the graphical object) and/or data from the one or more input devices of the electronic device 100 that is indicative of respective user inputs by the user for repeatedly changing the displayed section 102 of the graphical representation 101 to include the graphical object 103 (i.e. for repeatedly navigating to the graphical object). As described above, the training data may be used to train a machine-learning model of the user or be stored for lazy learning.

Figure 2:
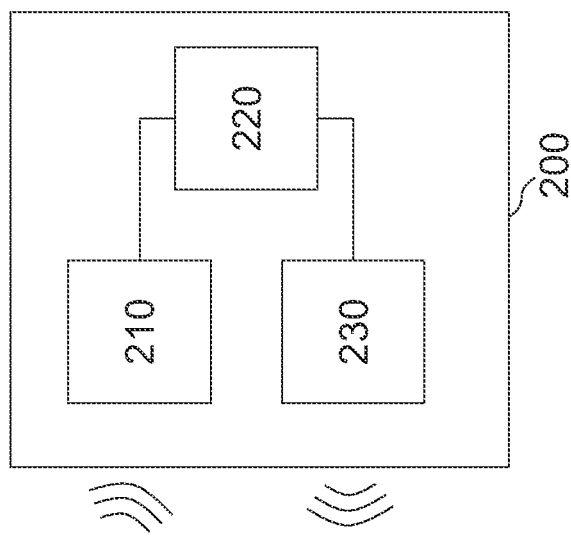
FIG. 2 illustrates an example of a system comprising an electronic device and a server.
Figure 2:
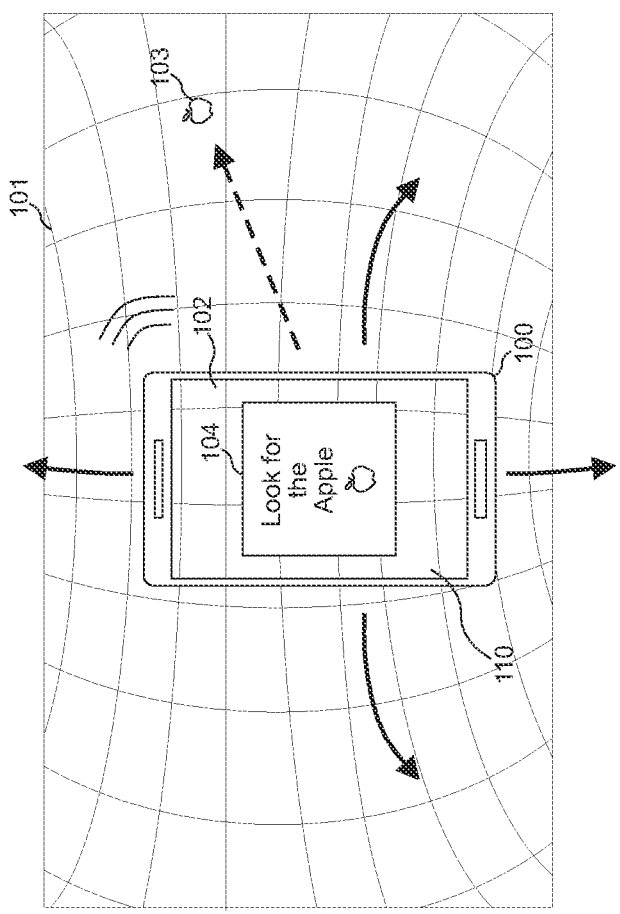

The alternative authentication of the user involving an external server will be described in connection with FIG. 2. FIG. 2 illustrates the electronic device 100 and an external server 200 (e.g. a single server or as part of a computing cloud). The electronic device 100 and the server 200 are capable of communicating with each other. For example, electronic device 100 and the server 200 may be capable of communicating wired (e.g. via a telephone network, a cable network, a fiber-optic network, etc.) or wirelessly (e.g. via a wireless local area network, a cellular network, etc.) with each other.

For authenticating the user based on the captured data, the second circuitry of the electronic device 100 is configured to transmit the data captured from the one or more sensors of the electronic device 100 and/or the one or more input devices of the electronic device 100 to the server 200. The server comprises a receiver 210 for receiving the captured data from the electronic device 100. Further, the server 200 comprises a processor 220 for comparing the captured data with reference data for the user. As described above, the reference data for the user may, e.g., be a machine-learning model of the user or training data of the user that is collected at the electronic device 100. An authentication result is obtained at the server 200 from the comparison of the captured data to the reference data for the user. A transmitter 230 of the server 200 is configured to transmit data related to the authentication result from the server 200 to the electronic device 100. The data related to the authentication result may, e.g., be data indicating success or failure of the authentication, data stored on the server 200 that were previously requested by the user, or data provided by a service running on the server 200 if the user previously requested access to the service. The second circuitry of the electronic device 100 is accordingly configured to receive the data related to the authentication result from the server 200.

For example, the second circuitry of the electronic device 100 may comprise a transmitter for transmitting the captured data to the server 200, and a receiver for receiving the data related to the authentication result from the server 200.

Similar to what is described above, training data for the user may be collected at the electronic device 100 and be transmitted to the server 200. The receiver 210 of the server may receive the training data and the processor 220 may use them for determining (training) the machine-learning model or as reference data for the comparison (lazy learning).

In some examples, the graphical representation 101 and/or the location of the graphical object 103 within the graphical representation 101 as displayed at the electronic device 100 may be controlled by the server 200. For example, the transmitter 230 may be configured to transmit data about the graphical representation 101 and/or the location of the graphical object 103 within the graphical representation 101 to the electronic device 100. The electronic device 100 may receive the data and accordingly display the graphical representation 101 to the user.

Figure 3:
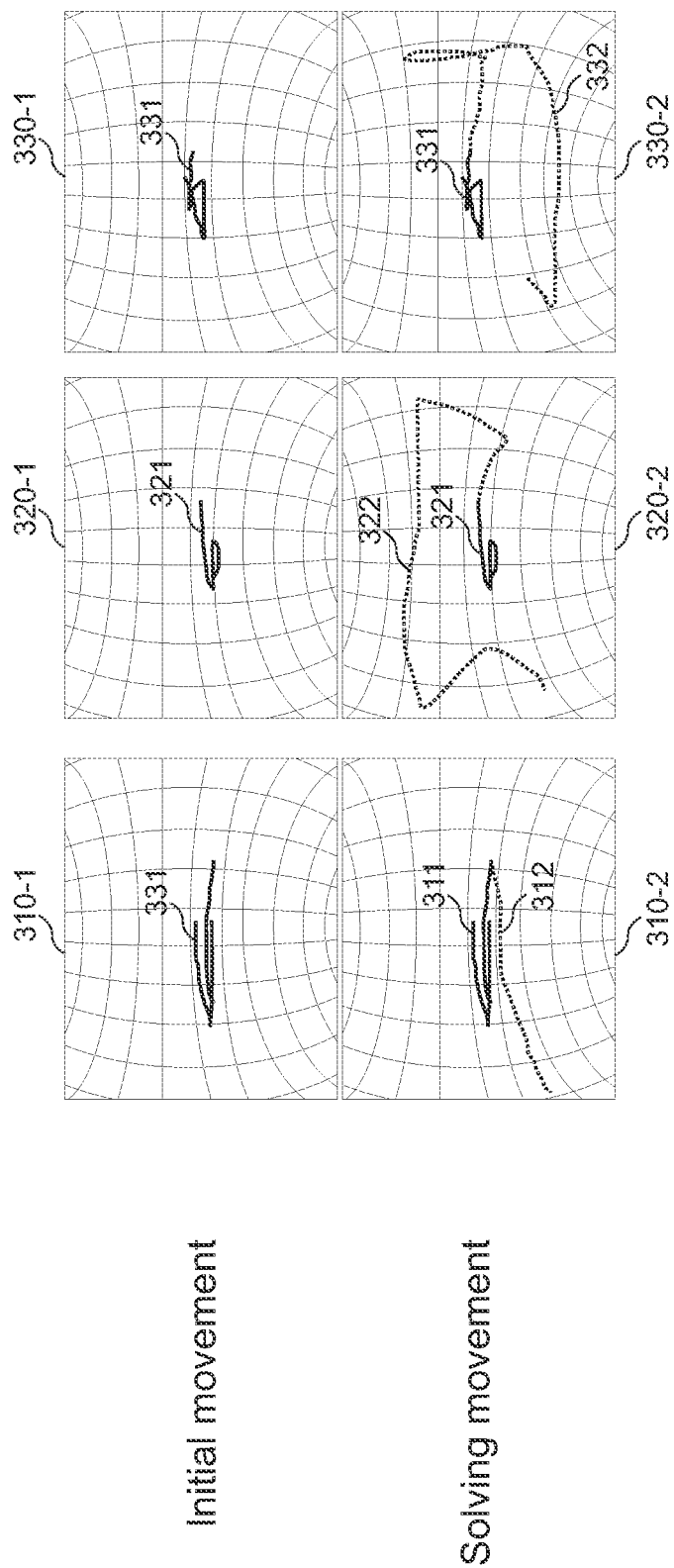
FIG. 3 illustrates exemplary user movements.

Some exemplary user movements for changing the displayed section of the graphical representation to include the graphical object are illustrated in FIG. 3. After requesting the user to change the displayed section of the graphical representation so that the graphical object is located inside the displayed section, the user will need some time to process what is shown on the screen of the electronic device, i.e. a reaction time will elapse before the user reacts to the request. Subsequently, the user will realize that he/she can move the displayed section of the graphical representation and start to interact with the displayed section of the graphical representation to get a feeling on how to navigate. The initial movement is user specific. Exemplary initial user movements 311, 321 and 331 of three different users are illustrated in graphical representations 310-1, 320-1 and 330-1 of FIG. 3. The initial user movements 311, 321 and 331 indicate the initial movement of the displayed section of the graphical representation by the individual user for getting a feeling on how to navigate. It can be seen from the graphical representations 310-1, 320-1 and 330-1 that each user exhibits a unique movement of the displayed section. The specific initial movement of the displayed section may, hence, be understood as an initial movement signature of the individual user and be used for authentication of the user.

After the initial movement, the user will use a certain pattern for navigating to the graphical object and, hence, solving the point-to-object challenge. In graphical representations 310-2, 320-2 and 330-2, the exemplary initial user movements 311, 321 and 331 are illustrated together with the solving movements 312, 322 and 332 of the three users for navigating the displayed section of the graphical representation to the graphical object. Again, it can be seen from the graphical representations 310-2, 320-2 and 330-2 that each user exhibits a unique movement of the displayed section. The specific solving movement of the displayed section may, hence, be understood as a solution movement signature of the individual user and be used for authentication of the user.

Therefore, for each required authentication of a user, a view to navigate may be shown to a user. The captured data of the sensors/input devices may be captured and compared to reference data for authenticating the user. The proposed technique may, hence, allow user authentication through navigation of a view using an electronic device such as a smartphone or a tablet.

In the above examples, a changeable section of a graphical representation is displayed to the user and the graphical object is located outside the initially displayed section of the graphical representation. However, the proposed user authentication is not limited to this specific example.

In other examples, the graphical object may be located inside the (initially) displayed section of the graphical representation together with one or more obstacles. Again, the user may be requested to navigate to the graphical object. For reaching the graphical object, the user needs to navigate around or through the one or more obstacles present in the graphical representation. Similar to what is described above for changing the displayed section of the graphical representation so that the graphical object is located inside the displayed section, the movement(s) for navigating around or through the one or more obstacles in order to reach the graphical object is user specific and may alternatively be used for authenticating the user—similar to what is described. In other words, instead of a graphical object that is located outside the initially displayed section of the graphical representation, a graphical object that is located inside the displayed section of the graphical representation together with one or more obstacles may be used.

In still other examples, the graphical object may be hidden in the displayed section of the graphical representation at a location (only) known to the user. In other words, the graphical object is present in the graphical representation but displayed transparent such that it is (at least initially) not visible. Since the location of the graphical object within the graphical representation is only known to the user, only the user is able to directly navigate to the invisible graphical object. Anybody else does not know the location of the graphical object within the graphical representation and, hence, cannot directly navigate to the invisible graphical object. Therefore, the movement(s) for navigating to the hidden graphical object is user specific and may alternatively be used for authenticating the user—similar to what is described. In other words, instead of a graphical object that is located outside the initially displayed section of the graphical representation, a graphical object hidden in the displayed section of the graphical representation at a location (only) known to the user may be used. After the user reached the hidden graphical object, the graphical object may be displayed visible for the user.

Figure 4:
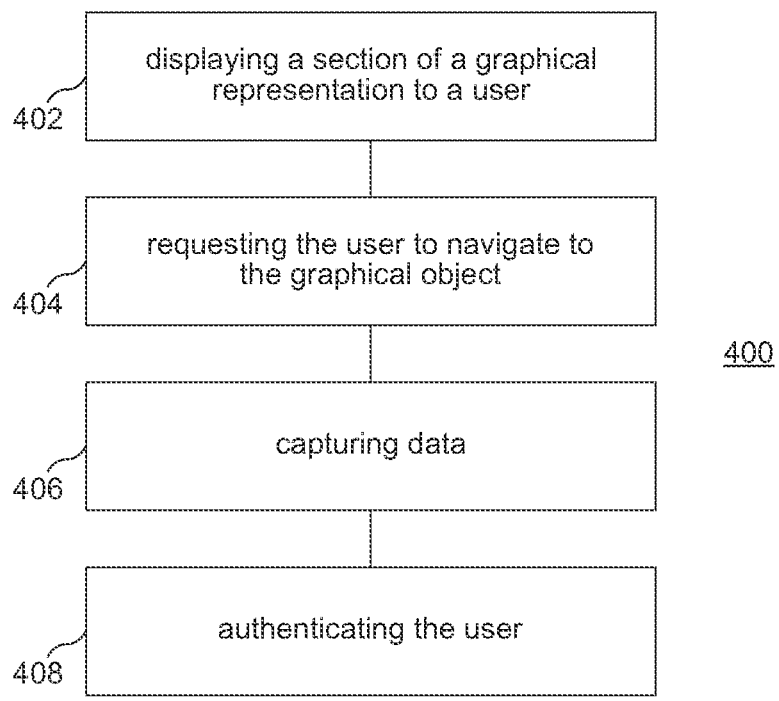
FIG. 4 illustrates a flowchart of an example of a method for authenticating a user of an electronic device.

In order to summarize the above aspects on authenticating a user of an electronic device, FIG. 4 illustrates a flowchart of a method 400 for authenticating a user of an electronic device. Method 400 comprises displaying 402 a section of a graphical representation to the user on a display of the electronic device. The graphical representation comprises a graphical object. Further, method 400 comprises requesting 404 the user to navigate to the graphical object. Additionally, method 400 comprises capturing 406 data from one or more sensors of the electronic device that is indicative of a movement of the electronic device by the user for navigating to the graphical object and/or data from one or more input devices of the electronic device that is indicative of a user input by the user for navigating to the graphical object. Method 400 further comprises authenticating 408 the user based on the captured data.

More details and aspects of method 400 are mentioned in connection with the proposed technique or one or more examples described above (e.g. FIG. 1). The method may comprise one or more additional optional features corresponding to one or more aspects of the proposed technique or one or more examples described above.

Figure 5:
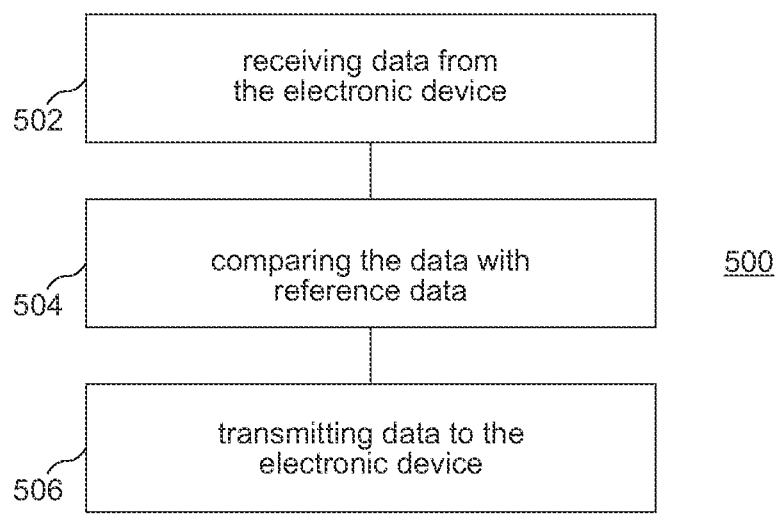
FIG. 5 illustrates a flowchart of an example of another method for authenticating a user of an electronic device.

FIG. 5 illustrates a flowchart of another method 500 for authenticating a user of an electronic device. Method 500 comprises receiving 502, at a server, data from one or more sensors of the electronic device that is indicative of a movement of the electronic device by the user for navigating to a graphical object within a graphical representation displayed to the user by the electronic device and/or data from one or more input devices of the electronic device that is indicative of a user input by the user for navigating to the graphical object. Further, method 500 comprises comparing 504, at the server, the data captured from the one or more sensors of the electronic device and/or the one or more input devices of the electronic device with reference data for the user in order to obtain an authentication result. Method 500 additionally comprises transmitting 506 data related to the authentication result from the server to the electronic device.

More details and aspects of method 500 are mentioned in connection with the proposed technique or one or more examples described above (e.g. FIG. 2). The method may comprise one or more additional optional features corresponding to one or more aspects of the proposed technique or one or more examples described above.

The following examples pertain to further embodiments:

(1) A method for authenticating a user of an electronic device. The method comprises displaying a section of a graphical representation to the user on a display of the electronic device. The graphical representation comprises a graphical object. Further, the method comprises requesting the user to navigate to the graphical object. Additionally, the method comprises capturing data from one or more sensors of the electronic device that is indicative of a movement of the electronic device by the user for navigating to the graphical object and/or data from one or more input devices of the electronic device that is indicative of a user input by the user for navigating to the graphical object. The method further comprises authenticating the user based on the captured data.

(2) The method of (1), wherein the graphical representation is changeable, and wherein the graphical object is located outside the initially displayed section of the graphical representation.

(3) The method of (1), wherein the graphical object is located inside the displayed section of the graphical representation together with one or more obstacles.

(4) The method of (1), wherein the graphical object is hidden in the displayed section of the graphical representation at a location known to the user.

(5) The method of any of (1) to (4), wherein the location of the graphical object within the graphical representation is determined by the user within an enrolment session.

(6) The method of any of (1) to (4), wherein the location of the graphical object within the graphical representation is different for each authentication session.

(7) The method of (1) or (6), wherein the location of the graphical object within the graphical representation is random.

(8) The method of any of (1) to (7), wherein authenticating the user based on the captured data comprises transmitting the data captured from the one or more sensors of the electronic device and/or the one or more input devices of the electronic device from the electronic device to a server for comparing the captured data with reference data for the user. Further authenticating the user based on the captured data comprises receiving data related to an authentication result from the server at the electronic device.

(9) The method of (8), wherein displaying the section of the graphical representation to the user on the display of the electronic device is carried out if the user requests access to data stored on the server or a service running on the server.

(10) The method of (8) or (9), further comprising receiving data about the graphical representation and/or the location of the graphical object within the graphical representation at the electronic device from the server.

(11) The method of any of (8) to (10), further comprising collecting training data for the user, wherein collecting the training data comprises repeatedly displaying the section of the graphical representation to the user. The training data comprises data from one or more sensors of the electronic device that is indicative of respective movements of the electronic device by the user for repeatedly navigating to the graphical object and/or data from one or more input devices of the electronic device that is indicative of respective user inputs by the user for repeatedly navigating to the graphical object. The method further comprises transmitting the training data from the electronic device to the server for determining the reference data from the training data.

(12) The method of any of (8) to (10), wherein the reference data for the user is a machine-learning model of the user.

(13) The method of any of (1) to (7), wherein authenticating the user based on the captured data comprises comparing the data captured from the one or more sensors of the electronic device and/or the one or more input devices of the electronic device with reference data for the user at the electronic device. Authenticating the user based on the captured data further comprises authenticating the user at the electronic device if the data captured from the one or more sensors of the electronic device and/or the one or more input devices of the electronic device matches the reference data.

(14) The method of (13), wherein displaying the section of the graphical representation to the user on the display of the electronic device is carried out if the user requests access to data stored on the electronic device or a service running on the electronic device.

(15) The method of (13) or (14), wherein the reference data for the user is a machine-learning model of the user.

(16) The method of (15), wherein the method further comprises determining the machine-learning model based on training data of the user that is collected at the electronic device.

(17) The method of (13) or (14), wherein the reference data for the user is training data of the user that is collected at the electronic device.

(18) The method of (16) or (17), further comprising collecting training data for the user at the electronic device. Collecting the training data comprises repeatedly displaying the section of the graphical representation to the user. The training data comprises data from one or more sensors of the electronic device that is indicative of respective movements of the electronic device by the user for repeatedly navigating to the graphical object and/or data from one or more input devices of the electronic device that is indicative of respective user inputs by the user for repeatedly navigating to the graphical object.

(19) A method for authenticating a user of an electronic device. The method comprises receiving, at a server, data from one or more sensors of the electronic device that is indicative of a movement of the electronic device by the user for navigating to a graphical object within a graphical representation displayed to the user by the electronic device and/or data from one or more input devices of the electronic device that is indicative of a user input by the user for navigating to the graphical object. Further, the method comprises comparing, at the server, the data captured from the one or more sensors of the electronic device and/or the one or more input devices of the electronic device with reference data for the user in order to obtain an authentication result. The method additionally comprises transmitting data related to the authentication result from the server to the electronic device.

(20) The method of (19), wherein the graphical representation is changeable, and wherein the graphical object is located outside the initially displayed section of the graphical representation.

(21) The method of (19), wherein the graphical object is located inside the displayed section of the graphical representation together with one or more obstacles.

(22) The method of (19), wherein the graphical object is hidden in the displayed section of the graphical representation at a location known to the user.

(23) The method of any of (19) to (22), wherein the reference data for the user is a machine-learning model of the user.

(24) The method of (23), wherein the method further comprises determining the machine-learning model of the user based on training data of the user that is received from the electronic device.

(25) The method of (24), wherein the training data comprises data from one or more sensors of the electronic device that is indicative of respective movements of the electronic device by the user for repeatedly navigating to the graphical object and/or data from one or more input devices of the electronic device that is indicative of respective user inputs by the user for repeatedly navigating to the graphical object.

(26) The method of (19), wherein the reference data for the user is data from one or more sensors of the electronic device that is indicative of respective movements of the electronic device by the user for repeatedly navigating to include the graphical object and/or data from one or more input devices of the electronic device that is indicative of respective user inputs by the user for repeatedly navigating to the graphical object.

(27) The method of any of (19) to (26), further comprising transmitting data about the graphical representation and/or the location of the graphical object within the graphical representation from the server to the electronic device.

(28) An electronic device for authenticating a user of the electronic device. The electronic device comprises a display configured to display a section of a graphical representation to the user. The graphical representation comprises a graphical object. Further, the electronic device comprises a human machine interface configured to output a request to the user to navigate to the graphical object. The electronic device additionally comprises first circuitry configured to capture data from one or more sensors of the electronic device that is indicative of a movement of the electronic device by the user for navigating to the graphical object and/or data from one or more input devices of the electronic device that is indicative of a user input by the user for navigating to the graphical object. Further, the electronic device comprises second circuitry configured to authenticate the user based on the captured data.

(29) A server for authenticating a user of an electronic device. The server comprises a receiver configured to receive data from one or more sensors of the electronic device that is indicative of a movement of the electronic device by the user for navigating to a graphical object within a graphical representation displayed to the user by the electronic device and/or data from one or more input devices of the electronic device that is indicative of a user input by the user for navigating to the graphical object. Further, the server comprises a processor configured to compare the data captured from the one or more sensors of the electronic device and/or the one or more input devices of the electronic device with reference data for the user in order to obtain an authentication result. The server additionally comprises a transmitter configured to transmit data related to the authentication result to the electronic device.

(30) A non-transitory machine readable medium having stored thereon a program having a program code for performing the method of any of (1) to (27), when the program is executed on a processor or a programmable hardware.

(31) A program having a program code for performing the method of any of (1) to (27), when the program is executed on a processor or a programmable hardware.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

Functions of various elements shown in the figures may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or—steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for authenticating a user of an electronic device, comprising:
    displaying a section of a graphical representation to the user on a display screen of the electronic device, wherein the graphical representation comprises a graphical object;
    requesting the user to navigate to the graphical object in the graphical representation on the display screen on the electronic device;
    collecting training data for the user, wherein collecting the training data includes repeatedly displaying the section of the graphical representation to the user, and wherein the training data includes data from one or more sensors of the electronic device that is indicative of respective movements of the electronic device by the user for repeatedly navigating to the graphical object and/or data from one or more input devices of the electronic device that is indicative of respective user inputs by the user for repeatedly navigating to the graphical object;
    capturing data from one or more sensors of the electronic device that is indicative of a movement of the electronic device by the user for navigating to the graphical object and/or data from one or more input devices of the electronic device that is indicative of a user input by the user for navigating to the graphical object in the graphical representation on the display screen on the electronic device; and
    authenticating the user based on the captured data including
        transmitting the training data from the electronic device to a server for determining reference data from the training data;
        transmitting the data captured from the one or more sensors of the electronic device and/or the one or more input devices of the electronic device from the electronic device to the server for comparing the captured data with the reference data for the user; and
        receiving data related to an authentication result from the server at the electronic device.

2. The method of claim 1, wherein the graphical representation is changeable, and wherein the graphical object is located outside the initially displayed section of the graphical representation.

3. The method of claim 1, wherein the graphical object is located inside the displayed section of the graphical representation together with one or more obstacles.

4. The method of claim 1, wherein the graphical object is hidden in the displayed section of the graphical representation at a predetermined location.

5. The method of claim 1, wherein the location of the graphical object within the graphical representation is determined by the user within an enrolment session.

6. The method of claim 1, wherein the location of the graphical object within the graphical representation is different for each authentication session.

7. The method of claim 1, wherein the location of the graphical object within the graphical representation is random.

8. The method of claim 1, wherein the reference data for the user is a machine-learning model of the user.

9. The method of claim 1, wherein authenticating the user based on the captured data comprises:
comparing the data captured from the one or more sensors of the electronic device and/or the one or more input devices of the electronic device with the reference data for the user at the electronic device; and
authenticating the user at the electronic device if the data captured from the one or more sensors of the electronic device and/or the one or more input devices of the electronic device matches the reference data.

10. The method of claim 9, wherein the reference data for the user is a machine-learning model of the user.

11. The method of claim 10, wherein the method further comprises determining the machine-learning model based on training data of the user that is collected at the electronic device.

12. The method of claim 9, wherein the reference data for the user is training data of the user that is collected at the electronic device.

13. A method for authenticating a user of an electronic device, comprising:
receiving, at a server, data from one or more sensors of the electronic device that is indicative of a movement of the electronic device by the user for navigating to a graphical object within a graphical representation displayed to the user on a display screen of the electronic device and/or data from one or more input devices of the electronic device that is indicative of a user input by the user for navigating to the graphical object on the graphical representation on the display screen of the electronic device;
comparing, at the server, the data captured from the one or more sensors of the electronic device and/or the one or more input devices of the electronic device with in order to obtain an authentication result, comparing including,
receiving training data from the electronic device to determine reference data from the training data, the training data for the user being collected by the electronic device by repeatedly displaying the section of the graphical representation to the user, and wherein the training data includes data from one or more sensors of the electronic device that is indicative of respective movements of the electronic device by the user for repeatedly navigating to the graphical object and/or data from one or more input devices of the electronic device that is indicative of respective user inputs by the user for repeatedly navigating to the graphical object; and
comparing the data with the reference data for the user to obtain the authentication result; and
transmitting data related to the authentication result from the server to the electronic device.

14. The method of claim 13, wherein the reference data for the user is a machine-learning model of the user.

15. The method of claim 14, wherein the method further comprises determining the machine-learning model of the user based on training data of the user that is received from the electronic device.

16. An electronic device for authenticating a user of the electronic device, comprising:
a display screen configured to display a section of a graphical representation to the user, wherein the graphical representation comprises a graphical object;
a human machine interface configured to output a request to the user to navigate to the graphical object on the graphical representation on the display screen of the electronic device;
first circuitry configured to
capture data from one or more sensors of the electronic device that is indicative of a movement of the electronic device by the user for navigating to the graphical object and/or data from one or more input devices of the electronic device that is indicative of a user input by the user for navigating to the graphical object on the graphical representation on the display screen of the electronic device, and
collect training data for the user including repeatedly displaying the section of the graphical representation to the user, wherein the training data includes data from one or more sensors of the electronic device that is indicative of respective movements of the electronic device by the user for repeatedly navigating to the graphical object and/or data from one or more input devices of the electronic device that is indicative of respective user inputs by the user for repeatedly navigating to the graphical object; and
second circuitry configured to authenticate the user based on the captured data including
determining reference data from the training data, and
comparing the captured data with the reference data for the user to obtain an authentication result.

17. A server for authenticating a user of an electronic device, comprising:
a receiver configured to receive data from one or more sensors of the electronic device that is indicative of a movement of the electronic device by the user for navigating to a graphical object within a graphical representation displayed to the user on a display screen of the electronic device and/or data from one or more input devices of the electronic device that is indicative of a user input by the user for navigating to the graphical object on the graphical representation on the display screen of the electronic device;
a processor configured to compare the data captured from the one or more sensors of the electronic device and/or the one or more input devices of the electronic device with reference data for the user in order to obtain an authentication result, wherein the reference data is determined from training data for the user collected by repeatedly displaying the section of the graphical representation to the user, and wherein the training data includes data from one or more sensors of the electronic device that is indicative of respective movements of the electronic device by the user for repeatedly navigating to the graphical object and/or data from one or more input devices of the electronic device that is indicative of respective user inputs by the user for repeatedly navigating to the graphical object; and
a transmitter configured to transmit data related to the authentication result to the electronic device.

* * * * *